United States Patent

[11] 3,624,279

[72] Inventor Edward W. Curtis
Indianapolis, Ind.
[21] Appl. No. 730,993
[22] Filed May 22, 1968
[45] Patented Nov. 30, 1971
[73] Assignee RCA Corporation

[54] COLOR TELEVISION RECEIVER HUE CONTROL
2 Claims, 3 Drawing Figs.

[52] U.S. Cl. 178/5.4 HE
[51] Int. Cl. H04n 9/48
[50] Field of Search 178/5.4
MC, 5.4 HE, 5.4 R; 333/29, 70 R, 75, 74

[56] References Cited

UNITED STATES PATENTS

| | | | |
|---|---|---|---|
| 2,956,242 | 10/1960 | Crib | 333/29 |
| 3,436,470 | 4/1969 | Konkel et al. | 178/5.4 HE |
| 3,463,875 | 8/1969 | Lovely | 178/5.4 |
| 3,520,991 | 7/1970 | Rhee et al. | 178/5.4 HE |

OTHER REFERENCES

RCA Technical Note No. 58 of issue No. 2 " Color Television Hue Control" R. B. Hansen November 9, 1957

*Primary Examiner*—Robert L. Griffin
*Assistant Examiner*—George G. Stellar
*Attorney*—Eugene M. Whitacre

ABSTRACT: A manually variable phase shifter in the chrominance amplifier channel of a color television receiver at a point subsequent to burst takeoff permits viewer to adjust hue of reproduced color image without disturbing ACC circuit operation. A manually variable amplitude control in the same channel provides viewer control of saturation of reproduced colors. Association of both "customer" color controls with same receiver channel permits use of single pair of shielded cables to couple color controls to associated color circuitry.

Figures 1, 2, 3:
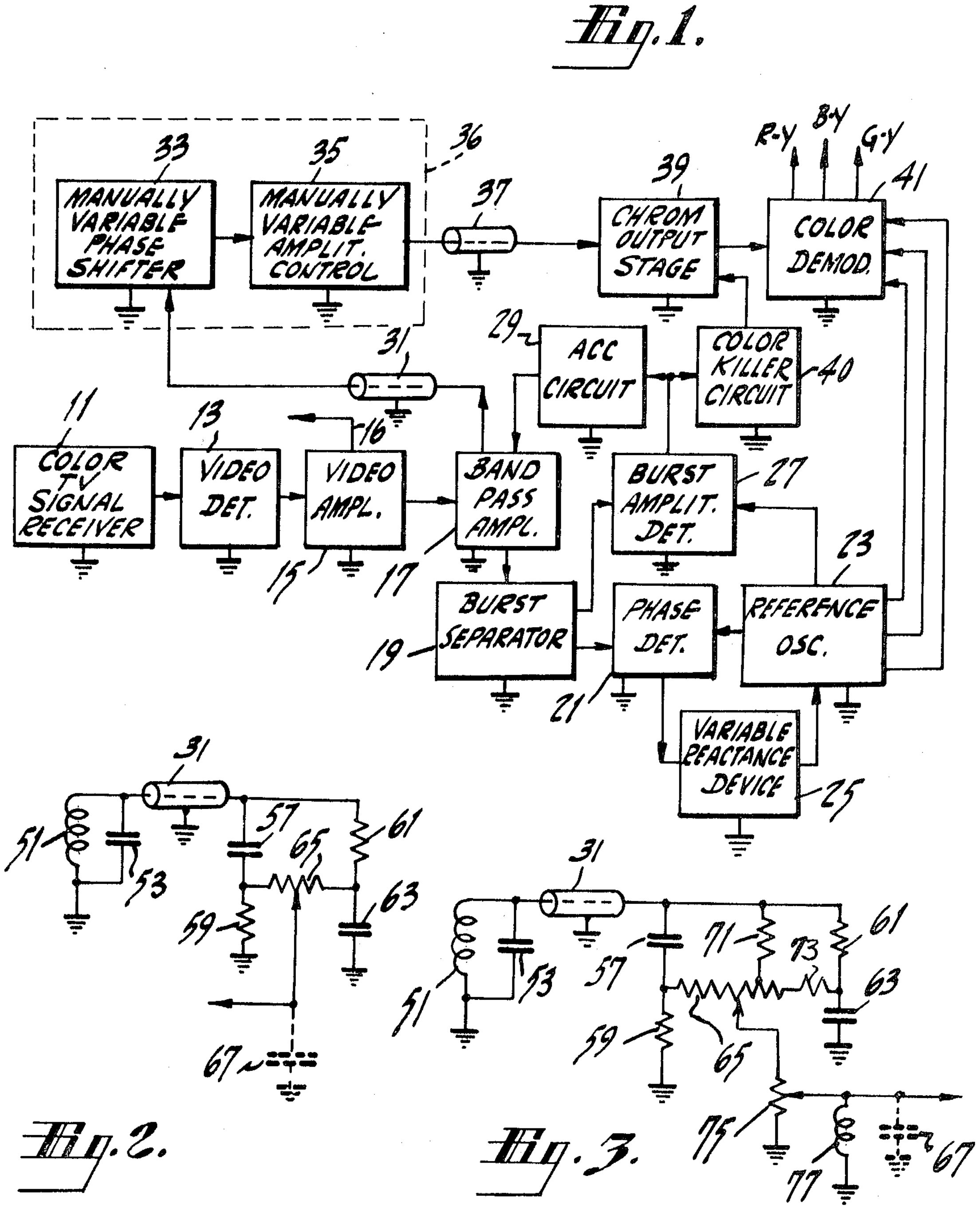

INVENTOR
EDWARD W. CURTIS
BY William H. Meagher
ATTORNEY

COLOR TELEVISION RECEIVER HUE CONTROL

The present invention relates generally to color television receiver control facilities and particularly to a color control arrangement involving advantageous techniques for hue adjustment.

In color television receivers of the type adapted to receive color television signals of the well-known NTSC form, it is customary to provide the viewer with convenient control facilities for independently adjusting hue and saturation (chroma) aspects of the reproduced color images. The hue control provides a manual adjustment of the effective subcarrier demodulation axes, introducing a shift of common magnitude and direction, while the manual chroma control affects the amplitude of the color subcarrier component subjected to demodulation.

In prior art receivers, it has been found appropriate to introduce the shift of demodulation angles by adjusting the phase of the receiver's source of color reference oscillations; such phase adjustment has involved either phase shifting the received color synchronizing bursts prior to their use in phase locking the reference source, or—in certain receiver arrangements employing an AFPC loop for color synchronization—phase shifting the reference oscillations applied to the AFPC detector.

Difficulties arise in the burst phase shift approach because of significant burst amplitude changes that may accompany the hue control adjustment over the relatively wide (±45°) range normally desired. Where the burst phase shift is introduced by detuning a resonant circuit through which the burst is passed, burst amplitude shifts of the order of 30 percent may typically be encountered. In addition to undersired effects on the reference source phase locking capabilities of the receiver, such amplitude shifts can introduce substantial undesired changes in chroma where the receiver incorporates ACC (automatic chroma control) action that depends upon monitoring burst amplitude.

In receivers having effective ACC systems, synchronous detection of burst amplitude is a practical necessity to avoid spurious responses to noise. This, however, complicates attempts to use the reference oscillation phase shift approach to hue control. Unless the local oscillation CW input to the ACC detector is referenced to the local oscillation CW input at the AFPC detector, spurious ACC error voltage may be developed as hue is varied due to changes in the detection angles in the ACC detector. On the other hand, where such referencing of the respective CW inputs to the detectors is employed, it can, as a practical matter, compromise the normal desire to have different burst level/CW level ratios at the respective detectors.

The present invention substantially avoids a number of receiver design problems of the character described above by removing the hue control function from association with phase shift of the reference input to the demodulators, and instead associating it with phase shift of the chrominance (modulated color subcarrier component) input to the demodulators. Interference between the hue control adjustment and performance of such receiver systems as AFPC, ACC and color killer, where employed is substantially precluded, and compromises or limits in the design of such systems dictated by the presence of a hue control within the reference source synchronizing system are removed.

In accordance with an embodiment of the present invention, a manually variable phase shifter is located in a color television receiver's frequency selective amplifying channel for the chrominance component at a point subsequent to burst takeoff. Adjustment of the phase shifter provides a common shift in the phase of the chrominance component input to the plurality of color demodulators employed in the receiver. Preferably, the shifter is designed to provide a range of adjustment of the order of ±45° without introducing significant amplitude shifts. A variable amplitude control for manual chroma control purposes may also be associated with this segment of the chrominance component amplifying channel subsequent to burst takeoff, whereby a single pair of shielded cables can suffice to couple these "customer" color controls (in typical cabinet mounted locations) to the associated chassis mounted circuitry.

An object of the present invention is to provide a novel and improved color television receiver hue control arrangement.

A further object of the present invention is to provide color performance control facilities for the viewer of a color television receiver that substantially avoid interference with burst utilization systems of the receiver, and that permit a relatively simple coupling arrangement with associated color circuitry.

Other objects and advantages of the present invention will be readily appreciated by those skilled in the art upon a reading of the following detailed description and an inspection of the accompanying drawing wherein:

FIG. 1 illustrates in simplified block form a portion of a color television receiver incorporating an embodiment of the present invention; and FIGS. 2 and 3 illustrate schematically particular control circuits that may be employed in the FIG. 1 receiver.

In the FIG. 1 diagram, the initial stages of a color television receiver are shown only by a composite block 11 designated "-color television signal receiver," and may comprise suitable tuner and IF circuitry for supplying an amplified intermediate frequency version of broadcast television signals to a video detector 13. Detector 13 recovers a composite video signal from the IF input thereto. The composite video signal is amplified by a video amplifier stage 15, which supplies a plurality of outputs to various segments of the receiver, including such circuits as the luminance channel, sync separator and automatic gain control circuits. Outputs to these receiver segments (not shown in the drawing) are indicated generally by the output lead 16.

A band-pass amplifier 17 responds to one of the outputs of video amplifier 15 and provides frequency selective amplification of the modulated color subcarrier or chrominance component of the recovered composite signal. The present invention is concerned with the operation of the color circuits of the receiver which respond to the output of band-pass amplifier 17, and, accordingly, the drawing is mainly directed to these circuits and their interrelationships.

A burst separator 19 extracts color synchronizing bursts from an output of band-pass amplifier 17 by suitable time-selective action; typically, separator 19 may comprise a frequency selective amplifier gated into conduction only during the appropriate portion of each horizontal retrace interval. The burst output of separator 19 is used to phase synchronize the receiver's local source of reference oscillations. Illustratively, the source comprises a reference oscillator 23 and the synchronizing system is of an AFPC loop form employing a phase detector 21, monitoring phase deviations between the burst output of separator 19 and a CW reference output of oscillator 23, and controlling oscillator operation by means of variable reactance device 25 to oppose such deviations.

The receiver of FIG. 1 also includes the burst amplitude detector 27 coupled to an output of burst separator 19 for deriving control information indicative of the amplitude of received bursts, if any, for automatic chroma control and color killer purposes. From noise immunity considerations, it is highly desirable that the detector 27 constitute a synchronous detector. Appropriate to such operation, detector 27 receives, in addition to a burst input from separator 19, an additional input from reference oscillator 23. The CW reference input is appropriately derived to permit in-phase operation of the detector 27 when the oscillator is suitably synchronized.

An output of detector 27 is supplied to an automatic chroma control circuit 29, which delivers a gain controlling voltage to the band-pass amplifier 17. The operation of the automatic chroma control circuit 29 eliminates spurious amplitude variations of the chrominance component passed by amplifier 17 as the spurious variations are reflected in variations of the otherwise constant amplitude bursts.

An output of the burst detector 27 is additionally applied to a color killer circuit 40, which responds to absence of a burst (or reduction of its amplitude to an inadequate level) by developing a disabling bias for a chrominance output stage 39. The chrominance output stage 39 is supplied with an output of band-pass amplifier 17 via a control network according with the principles of the present invention, and to be subsequently described. The output of stage 39 is supplied to color demodulation apparatus 41, which recovers a set of color difference signals of the form R–Y, B–Y and G–Y from the modulated subcarrier component delivered by stage 39. The synchronous detection operation is achieved through use of suitably phased outputs of the reference oscillator 23. While a variety of demodulating arrangements may be employed in receiver, many of which involve matrixing to recover one or more of the desired set of color difference signals, the illustrated demodulator arrangement contemplates, by way of example, the straight forward arrangement of employing three individual color demodulators operating to directly recover the R–Y, B–Y and G–Y signals.

Returning to the control network coupling signals from amplifier 17 to the output stage 39, it will be noted that the amplifier 17 output is applied via a shielded cable 31 to a manually variable phase shifter 33, the output of which is, in turn, applied to a manually variable amplitude control 35. An additional shielded cable 37 couples the signal output of control 35 to the input of chroma output stage 39. The phase shifter 33 provides a single, common adjustment of the phasing of the chrominance component delivered to each of the individual color demodulators 41, and serves as the vieuer's control of the hue aspect of the color images reproduced by the receiver's display device; the display device is not shown in the drawing, but may, by way of example, comprise a three-gun, shadow-mask kinescope responding to the color difference signals outputs of demodulators 41 to determine the coloring of the display image. The amplitude control 35 serves as the viewer's control of a saturation for chroma aspect or the reproduced color images. The controls 33 and 35 are physically located in a position, such as a cabinet mounted control panel (generally indicated by the dotted line rectangle 36), removed from the physical location of the associated color circuitry (which is typically chassis mounted). The shielded cables 31 and 37 serve to convey signals between the remote locations of the controls and associated circuits in a manner minimizing undesired radiations and interferences with circuit operations. It will be appreciated from analysis of the illustrated circuit configuration that the operation of such receiver segments as the reference oscillator 17 viewer's loop and the closed loop automatic chroma control system will be undisturbed in operation by the operation of the "customer" controls 33 and 35. Restrictions on the design of such systems, usually imposed by the presence of a hue control in a signal path with the reference oscillator 23, are substantially avoided. A single pair of shielded cables 31 and 37 serve to couple the color controls to the associated circuitry.

FIG. 2 provides a schematic illustration of one form of circuitry which may be employed as the structure of phase shifter 33 of FIG. 1. The secondary winding of an output transformer which may be employed in band-pass amplifier 17 is illustrated by coil 51 in FIG. 2, and constitutes a source of chrominance component signals. (e.g., fixed capacitor 53 shunts the secondary winding 51. The ungrounded terminal of coil 51 is coupled via the shielded cable 31 to the junction of a capacitor 57 and a resistor 61. A resistor 59 is connected in series with capacitor 57 to form a first series combination connected between the aforementioned junction and a point of reference potential e.g., ground). A capacitor 63 is connected in series with the resistor 61 to form a second series combination connected between the aforementioned junction and ground.

The relative values of capacitor 57 and resistor 59 are chosen to introduce at their junction a phase shift of approximately 45° (leading) at the frequency of the subcarrier. Conversely, resistor 61 and capacitor 63 provide at their junction a lagging phase shift of similar degree. A resistor 65 is bridged between the latter junctions, and takes the form of a potentiometer having a variable tap thereon, with the output of the phase shifter being derived from the variable tap.

Operation of the phase shifter of FIG. 2 is relatively straightforward. A 45° leading phase shift is obtained from the potentiometer tap when it is removed to the left-hand terminal at the junction of capacitor 57 and resistor 59; a 45° lagging phase shift is obtained when the tap is moved to the right-hand terminal at the junction of resistor 61 and capacitor 63. Values of phase shift intermediate these extremes (including a zero degree phase shift at the electrical center of the potentiometer) are obtained at intermediate positions of tap adjustment.

The combination signal at the output tap of potentiometer is a vector sum of particular proportions of the differently phased contributions that appear at the end terminals of the potentiometer. Considering the rules of vector addition, it will be apparent that the amplitude of the combination will vary to some extent with the position of the tap, ranging from essentially equal maximums at the ends to a minimum at the midpoint.

While the circuit of FIG. 2 appears substantially symmetrical, whereby the "off of the potentiometer 65 should represent the midrange point of adjustment, this is not necessarily so in practice, particularly where the load into which the phase shifter works as a significant capacitive component (represented in the drawing by the dotted-line capacitor 67). The effect of input capacitor 67 is to off-balance the control. This is due to an effective increase in the capacity present on the right-hand R–C phase shifter when the variable tap is set to that side, and the effective decrease in capacity of the left-hand C–R phase shifter when the tap is set to the left-hand side. This results in a decreased phase shift on the left-hand side and an increased phase shift on the right-hand side, thus "off centering" the control. Another effect of capacitance 67 is that when the tap of potentiometer 65 approaches the right-hand side, the input impedance to the system becomes very reactive, thus requiring the driving impedance to be low.

FIG. 3 illustrates a modification of the phase shifter circuit of FIG. 2 wherein means are added to correct to some extent the problems described above. Where components of FIG. 2 are repeated in FIG. 3, the same reference numerals are retained.

In the FIG. 3 modification, a resistor 71 has been added, and is connected between the common input to the two phase shifting paths and a fixed tap at an intermediate point of the resistance element of potentiometer 65. The resistor 71 so connected serves to pull up the amplitude at the electrical center of the bridge in order to decrease the chrominance component amplitude changes as the hue control is rotated through this range. The tapping point for this fixed tap is off-centered to match the electrical center of the bridging network.

An additional resistor 73 has been interposed between the junction of resistor 61 and capacitor 63 and the adjoining end terminal of potentiometer 65. The added resistor 73 serves two correcting functions: its addition tends to reduce the available range of the control on the right-hand side, thus tending to reduce the off-centering of the control range; additionally, its presence prevents a radical variation of the input impedance to the network (with consequent effects on the color band-pass amplifier tuning) when the tap is moved to the right-hand side.

The tap of potentiometer 65 is returned to ground in the FIG. 3 circuit via the resistance element of a potentiometer 75, illustrating one way in which the manual chroma control (control 35 of FIG. 1) may be cascaded with the hue control. A coil 77 has been added in parallel with the input capacitance 67, which appears in the FIG. 3 circuit between the variable tap of chroma control 75 and ground. The coil 77 serves to tune capacitor 67 to resonance at the subcarrier frequency. Such tuning serves to prevent the combination of capacitance 67 and potentiometer 75 from producing an undesired phase shift varying as a function of the manual chroma control setting. In addition, the resonating of capacitance 67 reduces its effect on the hue control.

By way of example, a table of values for parameters of phase shifter circuit of FIG. 3 which has proven satisfactory in practice is given below:

| | | |
|---|---|---|
| Capacitor 57 | 100 | picofarads |
| Capacitor 63 | 130 | picofarads |
| Resistor 59 | 390 | ohms |
| Resistor 61 | 560 | ohms |
| Potentiometer 65 | 2,500 | ohms |
| Resistor 71 | 1,000 | ohms |
| Resistor 73 | 470 | ohms |
| Coil 77 | 27 | microhenries |

What is claimed is:

1. In a color television receiver comprising a source of composite video signals including during color reception a modulated color subcarrier component and a synchronizing burst component, the combination comprising:

a frequency selective amplifying channel coupled to said source and having a passband encompassing the frequencies of said modulated subcarrier and burst components;

means coupled to said amplifying channel at an intermediate point thereof for extracting said burst component therefrom:

means providing a source of reference oscillations of subcarrier frequency and synchronized in phase in accordance with the extracted burst component:

a plurality of color demodulators coupled to an output terminal of said amplifying channel and responsive to oscillations from said source for deriving respectively different color information signals:

means for introducing a common shift in the hues represented by said different color information signals:

said hue shift introducing means comprising manually variable phase shifting means interposed in said amplifying channel between said point of burst extraction and said output terminal for shifting the phase of the modulated color subcarrier component at said output terminal:

wherein said phase shifting means includes a first path for said subcarrier component comprising a capacitance-resistance network introducing a leading phase shift; providing a first version of said subcarrier component at a first terminal; a second path for said subcarrier component, comprising a resistance-capacitance network introducing a lagging phase shift, providing a second version of said subcarrier component, differently phased than said first version, at a second terminal; and means including a variably tapped network bridging said first and second terminals for providing a combination of said first and second versions of said subcarrier component, the phasing of said combination of subcarrier component versions being determined by the variable tapping of said network;

said bridging network comprising a potentiometer having a variable tap at which said combination appears, a pair of fixed end terminals coupled respectively to said first and second terminals, and means for symmetrizing the phase shift versus tap adjustment characteristic of said potentiometer, said symmetrizing means comprising a first resistor interposed between said second terminal of said lagging phase shift introducing path and the associated end terminal of said potentiometer;

said apparatus also including means for enhancing equalization of the modulated color subcarrier component output amplitude for midrange positioning of said tap relative to end terminal positioning thereof, said amplitude equalization enhancing means comprising a second resistor coupled between an intermediate point on said potentiometer and the common input to said first and second paths.

2. In a color television receiver comprising a source of composite video signals including during color reception a modulated color subcarrier component and a synchronizing burst component, the combination comprising:

a frequency selective amplifying channel coupled to said source and having a passband encompassing the frequencies of said modulated subcarrier and burst components;

means coupled to said amplifying channel at an intermediate point thereof for extracting said burst component therefrom; means providing a source of reference oscillations of subcarrier frequency;

a plurality of color demodulators coupled to an output terminal of said amplifying channel and responsive to oscillations from said source for deriving respectively different color information signals;

means for introducing a common shift in the hues represented by said different color information signals; said hue shift introducing means comprising manually variable phase shifting means interposed in said amplifying channel between said point of burst extraction and said output terminal for shifting the phase of the modulated color subcarrier component at said output terminal;

an AFPC loop for phase synchronization of said reference oscillation source including a phase detector responsive to the output of said burst component extracting means and to an output of said reference oscillation source, each such output having a phase and an amplitude unaffected by operation of said variable phase shifting means;

means coupled to said extracting means for varying the gain of said amplifying channel prior to said point of burst extraction in accordance with the amplitude of said extracted burst component;

said gain varying means including means for synchronously detecting said extracted burst component, said detecting means responding to the output of said extracting means and to an output of said reference oscillation source, each such output having a phase and an amplitude unaffected by operation of said variable phase shifting means;

and means for varying the saturation of the colors represented by said different color information signals;

said saturation varying means comprising a manually varable amplitude control means cascaded with said phase shifting means in said amplifying channel between said burst extraction point and said output terminal and subject to adjustment independent of the adjustment of said phase shifting means, for varying the amplitude of the modulated color subcarrier component at said output terminal;

a single pair of shielded cables;

and means for utilizing said single pair of shielded cables to provide coupling between the cascade combination of said phase shifting means and said amplitude control means, in a receiver location remote from the remainder of said amplifying channel, and channel terminals intermediate said burst extraction point and said output terminal;

wherein said phase shifting means includes a first path for said subcarrier component, comprising a capacitance-resistance network introducing a leading phase shift, providing a first version of said subcarrier component at a first terminal; a second path for said subcarrier component, comprising a resistance-capacitance network introducing a lagging phase shift, providing a second version of said subcarrier component, differently phased than said first version, at a second terminal; and means including a variably tapped network bridging said first and second terminals for providing a combination of said first and second versions of said subcarrier component, the phasing of said combination of subcarrier component versions being determined by the variable tapping of said network;

said bridging network comprising a potentiometer having a variable tap at which said combination appears, a pair of fixed end terminals coupled respectively to said first and second terminals, and means for symmetrizing the phase shift versus tap adjustment characteristic of said potentiometer said symmetrizing means comprising a first resistor interposed between said second terminal of said lagging phase shift introducing path and the associated end terminal of said potentiometer;

said apparatus also including means for enhancing equalization of the modulated color subcarrier component output amplitude for mid-range positioning of said tap relative to end terminal positioning thereof, said amplitude equalization enhancing means comprising a second resistor coupled between an intermediate point on said potentiometer and the common input to said first and second paths.

* * * * *